US010699831B2

(12) United States Patent
Hamelinck et al.

(10) Patent No.: US 10,699,831 B2
(45) Date of Patent: Jun. 30, 2020

(54) RELUCTANCE TRANSDUCER

(71) Applicant: Nederlandse Organisatie voor toegepast-natuurwetenschappelijk onderzoek TNO, 's-Gravenhage (NL)

(72) Inventors: Roger Franciscus Mattheus Maria Hamelinck, 's-Gravenhage (NL); Christian Werner, 's-Gravenhage (NL)

(73) Assignee: NEDERLANDSE ORGANISATIE VOOR TOEGEPASTNATUURWET-ENSCHAPPELIJK ONDERZOEK TNO, 'S-Gravenhage (NL)

( * ) Notice: Subject to any disclaimer, the term of this patent is extended or adjusted under 35 U.S.C. 154(b) by 185 days.

(21) Appl. No.: 15/663,340

(22) Filed: Jul. 28, 2017

(65) Prior Publication Data
US 2017/0330664 A1    Nov. 16, 2017

Related U.S. Application Data

(62) Division of application No. 14/427,286, filed as application No. PCT/NL2013/050652 on Sep. 10, 2013, now abandoned.

(30) Foreign Application Priority Data

Sep. 11, 2012  (EP) .................................. 12183865

(51) Int. Cl.
H01F 7/18    (2006.01)
H01F 7/02    (2006.01)
(Continued)

(52) U.S. Cl.
CPC ....... *H01F 7/0289* (2013.01); *F16C 32/0465* (2013.01); *G01P 15/11* (2013.01);
(Continued)

(58) Field of Classification Search
CPC . H01F 7/02; H01F 7/08; H01F 7/0289; H01F 7/081; H01F 7/1646; H01F 2003/103; H01F 3/10; G01P 15/11
(Continued)

(56) References Cited

U.S. PATENT DOCUMENTS 2,912,522 A   11/1959  Knowles
3,203,447 A    8/1965  Bremner
(Continued)

FOREIGN PATENT DOCUMENTS

EP        0185769 B1    7/1986
JP     H09 303395 A    11/1997
(Continued)

OTHER PUBLICATIONS

International Search Report and Written Opinion, dated Dec. 3, 2013, in International Application No. PCT/NL2013/050652.

*Primary Examiner* — Shawki S Ismail
*Assistant Examiner* — Lisa N Homza
(74) *Attorney, Agent, or Firm* — Knobbe, Martens, Olson & Bear, LLP

(57) ABSTRACT

A reluctance transducer includes a soft ferromagnetic yoke and a soft ferromagnetic core element, which is movable relative to the yoke. Two permanent magnets bear the core element. The permanent magnets are arranged relative to each other and to the yoke so that the reluctance transducer has a good linear relationship between displacement and force. The reluctance transducer can be applied as stiffness compensating element. The reluctance transducer can include an electrical winding to allow its application as a magnetic bearing, an actuator or as a displacement, velocity or acceleration sensor with improved intrinsic linearity.

13 Claims, 15 Drawing Sheets

(51) Int. Cl.
*F16C 32/04* (2006.01)
*H01F 3/10* (2006.01)
*H02N 15/00* (2006.01)
*H01F 7/16* (2006.01)
*G01P 15/11* (2006.01)
*H01F 7/08* (2006.01)

(52) U.S. Cl.
CPC ............... *H01F 3/10* (2013.01); *H01F 7/081* (2013.01); *H01F 7/1646* (2013.01); *H02N 15/00* (2013.01); *H01F 2003/103* (2013.01)

(58) Field of Classification Search
USPC ........................................................ 335/229
See application file for complete search history.

(56) References Cited

U.S. PATENT DOCUMENTS

| | | | |
|---|---|---|---|
| 3,379,214 A | | 4/1968 | Weinberg |
| 3,562,687 A | | 2/1971 | Tavis |
| 3,872,455 A | | 3/1975 | Fuller |
| 4,080,012 A | | 3/1978 | Boden |
| 4,316,167 A | * | 2/1982 | Koehler .................... H01F 7/08 335/229 |
| 4,422,060 A | * | 12/1983 | Matsumoto ............... H01F 7/13 335/234 |
| 4,644,311 A | * | 2/1987 | Guery ................ H01H 51/2209 335/230 |
| 4,782,315 A | | 1/1988 | Bataille |
| 4,746,886 A | | 2/1988 | Uetsuhara |
| 4,797,645 A | | 1/1989 | Uetsuhara |
| 4,994,776 A | * | 2/1991 | Juncu .................... H01F 7/1615 335/230 |
| 5,166,652 A | * | 11/1992 | Koyama ................ D04B 15/78 335/234 |
| 5,209,454 A | | 5/1993 | Engdahl |
| 5,394,131 A | | 2/1995 | Lungu |
| 5,734,310 A | * | 3/1998 | Ankney .................. H01F 7/121 335/228 |
| 6,563,238 B1 | | 5/2003 | Lee |
| 6,873,067 B2 | * | 3/2005 | Ichii ....................... A61C 17/34 310/15 |
| 7,166,069 B2 | | 1/2007 | Schneider |
| 7,710,227 B2 | | 5/2010 | Schmidt |
| 8,154,957 B1 | | 4/2012 | Katsnelson |
| 8,212,640 B1 | * | 7/2012 | Tuschner ............... H01F 7/1615 335/219 |
| 8,228,151 B2 | | 7/2012 | Schmidt |
| 8,704,625 B2 | | 4/2014 | Schmidt |
| 10,024,453 B2 | * | 7/2018 | Robertson ........... F16K 31/0655 |
| 2002/0008601 A1 | | 1/2002 | Yajima |
| 2002/0039061 A1 | | 4/2002 | Timashov |
| 2002/0175578 A1 | | 11/2002 | McMullen |
| 2004/0085173 A1 | | 5/2004 | Decristofaro |
| 2004/0085174 A1 | | 5/2004 | Decristofaro |
| 2004/0212269 A1 | | 10/2004 | Decristofaro |
| 2006/0023390 A1 | * | 2/2006 | Spurr ..................... E05B 81/14 361/160 |
| 2006/0082227 A1 | * | 4/2006 | Gerhartz ............... F16K 31/082 310/15 |
| 2006/0163971 A1 | | 7/2006 | Gunderson |
| 2009/0009277 A1 | | 1/2009 | Sodo |
| 2010/0074777 A1 | * | 3/2010 | Laufer .................... F04D 13/12 417/420 |
| 2010/0117627 A1 | | 5/2010 | Filatov |
| 2011/0006866 A1 | | 1/2011 | Pinter |
| 2011/0073118 A1 | * | 3/2011 | Ponsort ................. A61F 5/3761 128/845 |
| 2011/0267159 A1 | | 11/2011 | Schiepp |
| 2012/0212723 A1 | | 8/2012 | Hoi |
| 2013/0038145 A1 | * | 2/2013 | Fujiwara ................ H02K 33/16 310/20 |
| 2014/0354381 A1 | | 12/2014 | Kohlhafer |
| 2015/0137642 A1 | | 5/2015 | Vande Sande |

FOREIGN PATENT DOCUMENTS

| | | |
|---|---|---|
| WO | WO 98/37335 A1 | 8/1998 |
| WO | WO 2007/099849 A1 | 9/2007 |

* cited by examiner

RELUCTANCE TRANSDUCER

CROSS REFERENCE TO RELATED APPLICATIONS

This application is a Divisional Application of U.S. application Ser. No. 14/427,286, filed Mar. 10, 2015, which is the U.S. National Phase of International Application No. PCT/NL2013/050652, filed Sep. 10, 2013, designating the U.S. and published in English as WO 2014/042525 on Mar. 20, 2014 which claims the benefit of European Patent Application No. 12183865.0, filed Sep. 11, 2012. Any and all applications for which a foreign or domestic priority claim is identified in the Application Data Sheet as filed with the present application are hereby incorporated by reference under 37 CFR 1.57.

FIELD

The invention relates to a reluctance transducer comprising a soft ferromagnetic yoke and a soft ferromagnetic core element being movable relative to each other and further comprising two permanent magnets. More in particular the invention relates to such a reluctance transducer comprising a soft ferromagnetic yoke having a first end and a second end, the first end and the second end defining an intermediate space, and comprising a soft ferromagnetic core element partly filling the intermediate space, the core element and yoke being movable relative to each other in a direction between the first end of the yoke and the second end of the yoke and further comprising a first permanent magnet and a second permanent magnet arranged relative to each other such that the permanent magnets exert opposite magnetic forces on the core element.

RELATED ART

Reluctance transducers are applied either as passive transducer or as active transducer. Passive reluctance transducers are used as stiffness compensating element. Active reluctance transducers are implemented for application as an actuator, as a sensor or as a magnetic bearing. Such active transducers comprise an electrical winding to generate a magnetic flux in the soft magnetic yoke. The position of the core element relative to the yoke can be influenced by varying the current in the winding which allows the application as an actuator. The reluctance transducer can also be applied as a sensor whereas moving the core element relative to the yoke results in an electrical current in the winding.

International application WO98/37335 discloses a magnetic bearing and drive. This known reluctance transducer, as shown in FIG. 1, comprises two permanent magnets that are clamped between two magnetic yokes. A movable core element is partly filling the space between the ends of the yokes. A portion of each of the yokes is wound with an electrical winding. A disadvantage of this know reluctance transducer is that it is rather complex and that it is limited in the number of different embodiments that can be realised.

SUMMARY

An objective of the present invention is to provide a reluctance transducer with improved performance, more in particular with a better intrinsic linearity.

This objective of the invention is obtained by a reluctance transducer comprising
a soft ferromagnetic yoke having a first end and a second end, the first end and the second end defining an intermediate space,
a soft ferromagnetic core element partly filling the intermediate space, the core element and the yoke being movable relative to each other in a direction between the first end of the yoke and the second end of the yoke,
a first permanent magnet and a second permanent magnet arranged relative to each other such that the first magnet and the second magnet exert opposite forces on the core element, and
wherein a first pole of the first magnet is mechanically and magnetically coupled by an intermediate soft ferromagnetic element to an equivalent pole of the second magnet, characterized in that a second pole of the first magnet is magnetically insulated from an equivalent second pole of the second magnet.

An advantage of coupling only one set of equivalent magnet poles, for example the South poles, mechanically and magnetically with each other via a soft ferromagnetic element is that there are mainly just two magnetic flux circuits for each of the permanent magnets. This means that there are two main paths outside each magnet along which the magnetic field lines are closed. When displacing the core element relative to the yoke in a direction towards one of the two ends, in first order approximation the magnetic resistance of only one of the magnetic circuits varies. The effect of such a magnetic circuit is that the relationship between the displacement of the core element and the force exerted on that element is better linear than in the known transducers, whereas the design of the transducer is less complex. This effect results in a reluctance transducer with improved performance and a less complex design. More in particular it results in a reluctance transducer that is intrinsically better linear than known reluctance transducers, without the need of electronic control measures.

DETAILED DESCRIPTION

The reluctance transducer will be described in view of several embodiments. The invention, however, is not limited to these embodiments.

Figure 1:
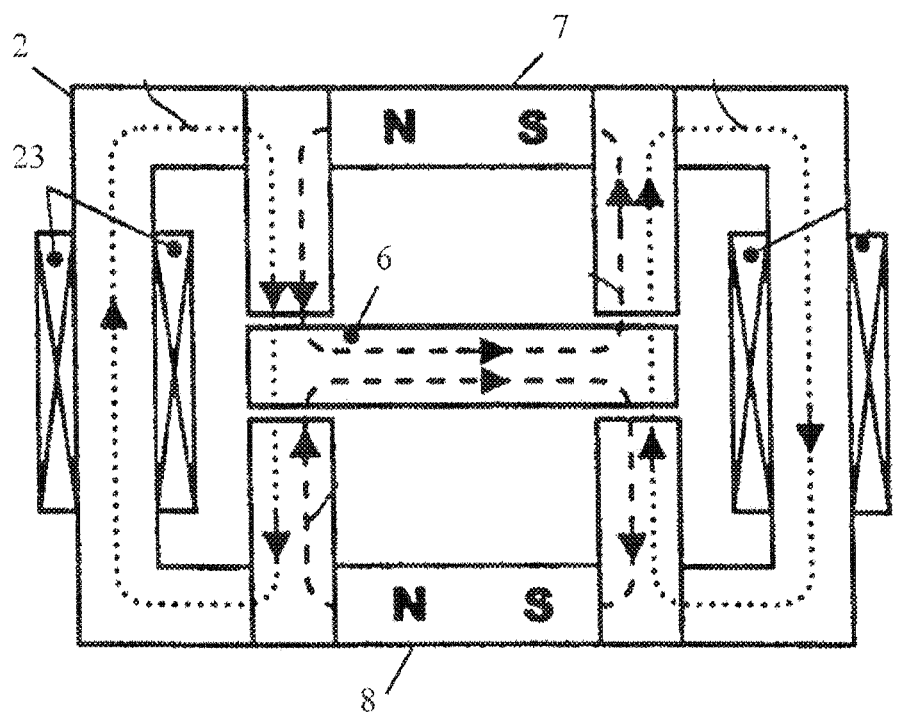
FIG. 1 shows a reluctance transducer according to the prior art.
Figure 2:
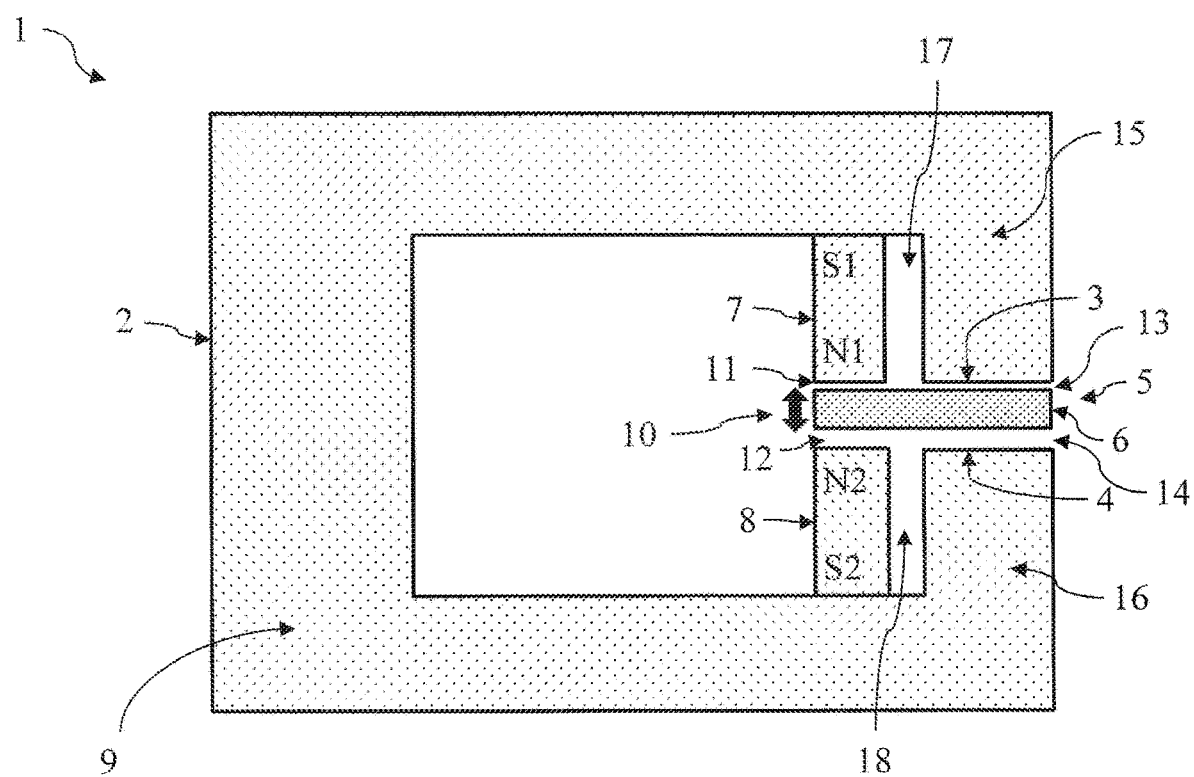
FIG. 2 shows a schematic drawing of an embodiment of the reluctance transducer that can be applied for stiffness compensation.

In FIG. 2 a first embodiment of the reluctance transducer is shown schematically in cross section. The shape of the soft ferromagnetic yoke (2) of the transducer (1) has some similarity with a horseshoe, defining an intermediate space (5) between the two ends (3,4) of the yoke for receiving the soft ferromagnetic core element (6). The yoke has two end portions, a first end portion (15) with the first yoke end (3) and a second end portion (16) with the second yoke end (4). The core element and the yoke are movable relative to each other in a direction indicated by the arrow. It is noted that a movement in a perpendicular direction may be prevented or allowed. In the latter case the movement of the core element may be a movement in the combined horizontal en vertical direction. To allow a movement in the direction of the arrow, viz. in the direction from the first end (3) of the yoke to the second end (4) of the yoke and vice versa, there are movement spaces at each side of the core element. A first movement space (13) is present between the first end (3) of the yoke and the core element. A second movement space (14) is present between the second end (4) of the yoke and the core element.

The yoke and the core element are soft ferromagnetic which means that they have the property to conduct a magnetic flux. Soft ferromagnetic materials can be magnetised but do not remain magnetised permanently after removal of the cause of magnetisation. Although the yoke and the core element of the reluctance transducer can be made out of any soft ferromagnetic material, they are preferably made of ferromagnetic materials selected from the group consisting of iron, cobalt, nickel, and steel or made of materials mainly made out of these ferromagnetic materials.

The two permanent magnets (7,8) are arranged opposite to each other at the inner side of the yoke such that the two magnets define a space (10) for receiving the movable core element. The magnets are arranged parallel to the end portions (15,16) of the yoke and are facing each other with equivalent magnetic poles (N1,N2), for example the North poles. So the magnets are oriented in opposite direction along a common line through the magnetic axis of the magnets. The poles (N1, N2) are magnetically insulated from each other by the intermediate space (10), which space is partially filled by the core element. To allow movement of the core element in the direction of the arrow, there is a first movement space (11) between the core element and the first magnet (7) and a second movement space (12) between the core element and the second magnet.

The other poles (S1,S2) of the two magnets, for example the South poles, are mechanically and magnetically coupled to each other via an intermediate soft ferromagnetic element (9), in this embodiment being a portion of the yoke. This soft ferromagnetic element with its low magnetic resistance allows the magnetic flux to pass. The magnets (7,8) are arranged relative to the end portions (15,16) of the yoke such that there is a space (17,18) between each magnet and the corresponding end portion of the yoke to avoid a short circuiting of the magnetic field. Preferably the distance between the magnets and the end portions is much larger than the distance between the core element and the magnets.

The core element is adapted to be movable in the space that is formed by the intermediate space (10) between the permanent magnets and the intermediate space (5) between the ends of the yoke in a direction from the first end (3) of the yoke to the second end (4) of the yoke and vice versa. So, the thickness of the core element, the distance between the two ends of the yoke, and the distance between the magnets is such that there is sufficient room for movement of the core element. In a preferred embodiment the distance between the ends of the yoke and the distance between poles (N1,N2) of the magnets is the same. Further, the intermediate space (10) between the permanent magnets may be located mainly in line with the intermediate space (5) between the ends of the yoke, i.e. the ends (3,4) of the yoke may be positioned on substantially the same offset position as the facing end portions of the poles (N1, N2) of the corresponding permanent magnets (7,8). In such an embodiment the thickness of the core element, which may be a disc or plate, may be uniform. Alternatively, the intermediate space (10) between the permanent magnets may be staggered relative to the intermediate space (5) between the ends of the yoke. Further, the distance between the poles (N1,N2) and the ends (3,4) may be different and the thickness of the core element may be different at different position, for example between the magnets and between the yoke ends. Then, the core element may have a non-uniform contour, e.g. having a staggered profile.

In the lateral direction, viz. in the direction perpendicular to the arrow, the core element is sufficiently long to extend at least partially between both the permanent magnets and the ends of the yoke to allow magnetic flux of both magnets going through the core element. When reference is made to a moving or movable core element, it is understood that this includes situations in which the yoke or the magnets are moving or movable relative to the core element.

This embodiment of the transducer can be applied for stiffness compensation because of its negative stiffness. However, by applying a winding at a portion of the yoke such an embodiment of the transducer can be applied as a magnetic bearing, an actuator, or as a sensor.

Figure 3:
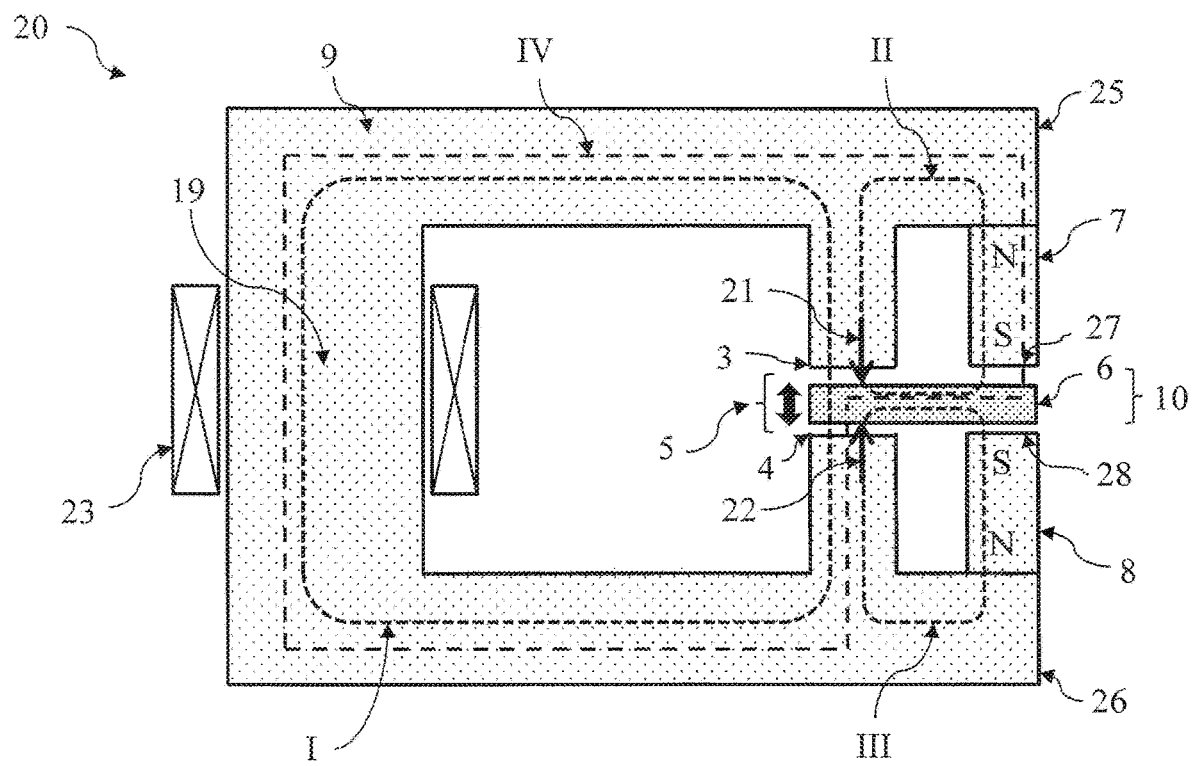
FIG. 3 shows an embodiment of the reluctance transducer that can be applied as a magnetic bearing, an actuator, or sensor.

FIG. 3 shows an embodiment of the reluctance transducer (20) in which the permanent magnets (7,8) are arranged different from the embodiment in FIG. 2. Here the permanent magnets are arranged at the periphery of the yoke. The embodiment of the reluctance transducer (20) shown in FIG. 3 comprises an electrical winding and can be applied as a magnetic bearing, as an actuator or as a sensor. The winding (23) is wound around a portion (19) of the yoke such that an electrical current in the winding will induce a magnetic flux (I) in the soft ferromagnetic yoke. Each of the two end portions of the yoke splits up in two branches. One of the ends (3,4) at each end portion defines an intermediate space (5) similar to the embodiment of FIG. 2. At the other branches (25,26), the two permanent magnets (7,8) are arranged such that the ends (3,4) of the yoke and the free ends of the magnets define an intermediate space for receiving the soft ferromagnetic core element (6), which element is movable in a direction from the first end (3) of the yoke to the second end (4) of the yoke and vice versa. It is appreciated that the considerations concerning the position of the magnets relative to the yoke and the dimensions of the core element given for the embodiment of FIG. 2 also apply for this embodiment.

Also shown in FIG. 3 are two magnetic flux circuits (II,III), one from each of the permanent magnets. Circuit (II) comprises the first permanent magnet (7) and circuit (III) comprises the second permanent magnet (8). The direction of the magnetic flux (21) of the first permanent magnet (7) at the first end (3) is opposite to the direction of the magnetic flux (22) of the second permanent magnet (8) at the second end (4) of the yoke. In FIG. 3, the South poles of the permanent magnets are facing each other and are insulated from each other by the space (10) which is partly filled by the core element (6). The North poles are mechanically and magnetically coupled by a soft ferromagnetic portion (9) of the yoke. The permanent magnets may also be arranged such that the North poles are facing each other and the South poles are coupled magnetically by a portion of the soft ferromagnetic yoke. For each of the permanent magnets there is an additional circuit of which only the circuit (IV) comprising the first magnet is shown.

Figure 4:
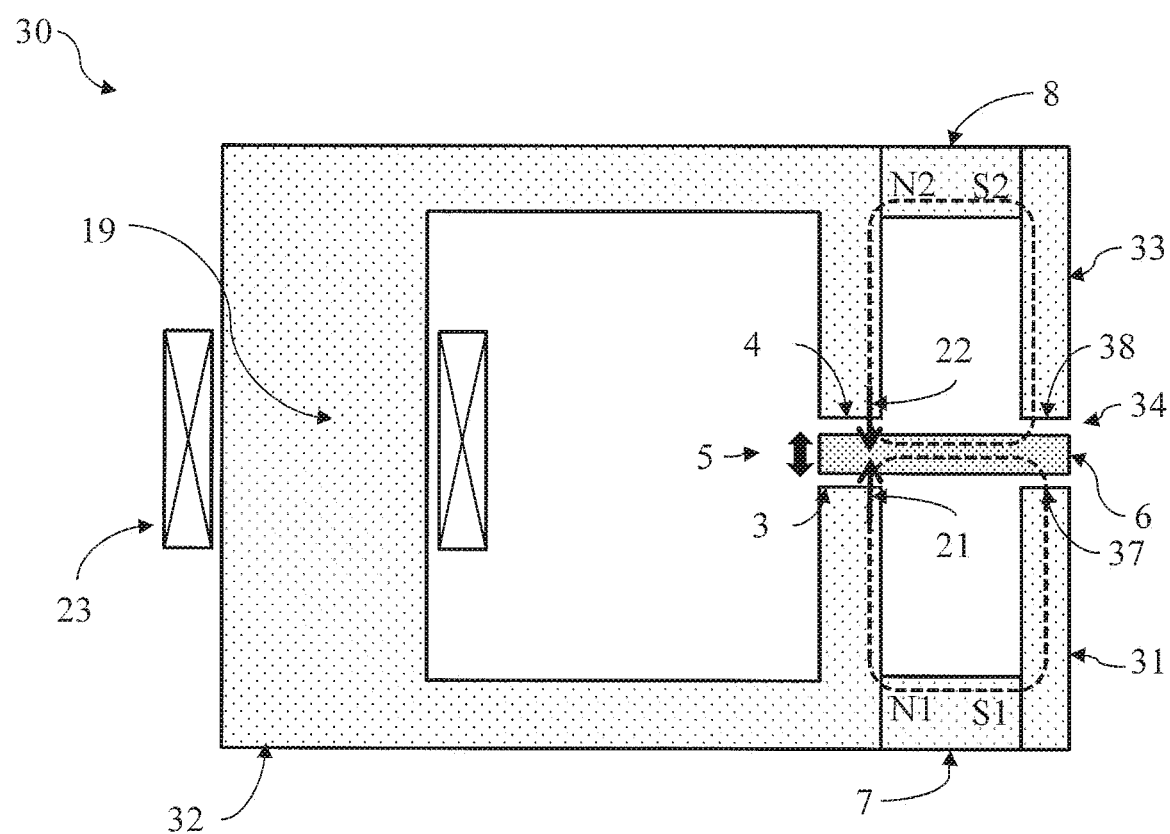
FIG. 4 shows an embodiment of the reluctance transducer wherein the magnets are arranged within the yoke.

It is noted that the magnets in the embodiment of FIG. 3 may be arranged at different positions to obtain a similar magnetic circuit. As an example, one such an embodiment is shown in FIG. 4. The yoke of this reluctance transducer comprises three separate soft ferromagnetic portions. The first portion (32) has a form similar to a horse shoe. An electrical winding (23) is wound around a part (19) of this portion if the transducer is applied as a magnetic bearing, as an actuator or as a sensor. As mentioned before, this winding may be omitted for application as stiffness compensation. The two ends (3,4) of this portion of the yoke leave an intermediate space (5) for the movable soft ferromagnetic core element (6). A second soft ferromagnetic portion (31) of the yoke is mechanically coupled with the first portion by the first permanent magnet (7). The third soft magnetic portion (33) of the yoke is mechanically coupled with the first portion by the second permanent magnet (8) and separated from the second portion by a space (34) that is partly filled by the soft ferromagnetic core element. The first magnet and the second magnet are arranged such that the direction (21) of the magnetic flux of the first magnet (7) at the first end (3) of the yoke is opposite to the direction (22) of the second magnet (8) and the second end (4). The same holds mutatis mutandis for the flux at the free ends (37,38) of the second and third portion of the yoke. There, the flux from the first magnet (7) is directed downwards and the direction of the flux from the second magnet (8) is directed upwards. The core element (6) is situated in the space formed by the space between the two ends (3,4) of the first portion of the yoke and the space between the free ends (37,38) of the second and third soft ferromagnetic portion of the yoke, respectively. The embodiments shown in the FIGS. 3 and 4 are symmetric with respect to a horizontal line through the core element and the electrical winding. It is noted that several other arrangements of winding and magnets are possible. The winding may for example be wound around the upper or lower part of the yoke. Further, an embodiment that is a hybrid of the embodiment shown in FIGS. 3 and 4 is possible. The first magnet (7) can be arranged relative to the yoke as shown in FIG. 3, while the second magnet (8) is arrange in the yoke as shown in FIG. 4.

Figure 5:
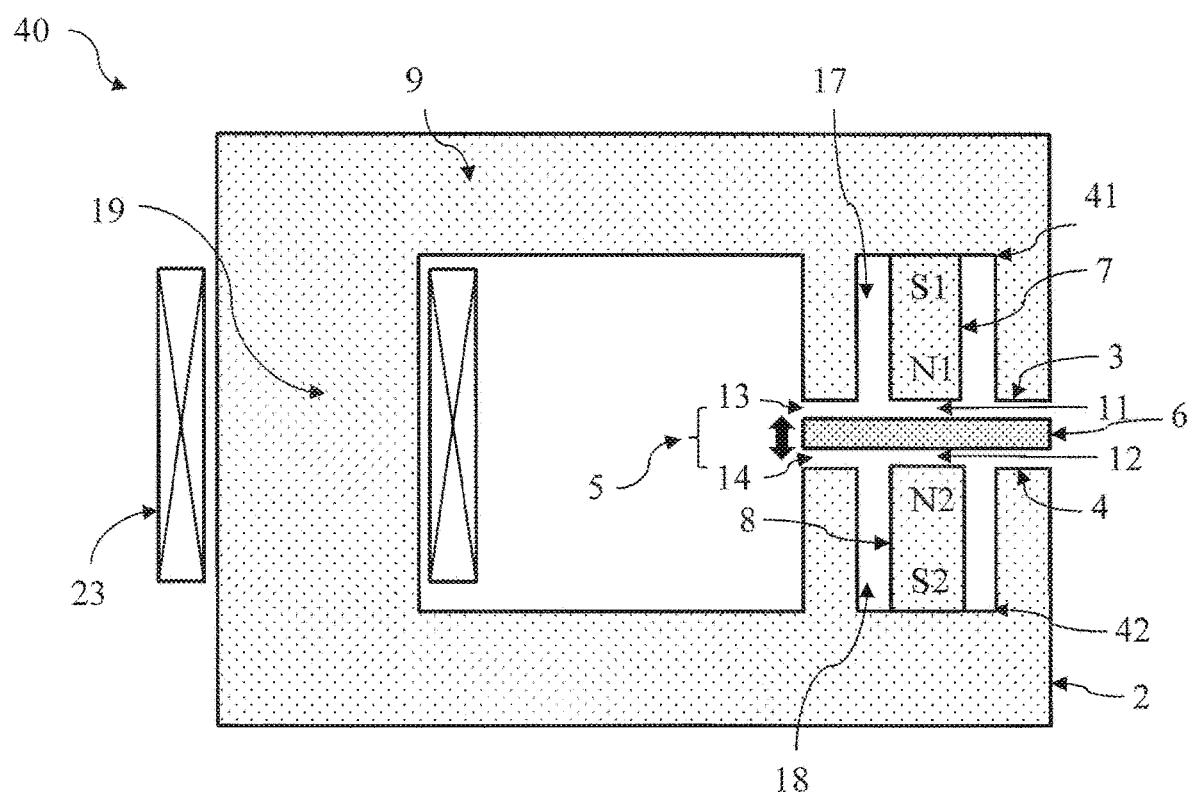
FIG. 5 shows a cross-sectional view of a preferred embodiment of the reluctance transducer that can be applied as an actuator, as a sensor, or as magnetic bearing.

FIG. 5 shows a cross-sectional view of a preferred embodiment of the reluctance transducer (40), which can be applied as a magnetic bearing, as an actuator or as a sensor.

In this embodiment of the reluctance transducer, the two ends (3,4) of the soft ferromagnetic yoke (2) are provided with a cavity (41,42) in which a permanent magnet (7,8) is arranged. The cavities may be as deep as the length of the magnets thus creating a flat surface of magnet and yoke at the sides facing the core element (6). However, the magnets may also be longer such that they protrude from the ends of the yoke. The magnets may also be shorter such that there is a deepening at the position of the magnets. The magnets are arranged opposite to each other such that the equivalent poles (N1,N2) are facing each other. In FIG. 5, it are the North poles but it may also be the South poles of the permanent magnets. The magnets are mechanically and magnetically coupled to the yoke at the equivalent poles (S1,S2) and a portion (9) of the yoke couples the two equivalent poles magnetically. Between the inner side walls of the cavities (41,42) and the magnets (7,8) there is a space (17,18), Preferably this space, more in particular the distance between the magnets and the side walls of the cavities, is much larger than the distance between the other equivalent poles (N1,N2) and the core element.

The magnets and the ends of the yoke define a space (5) in which the movable core element (6) is situated. More in particular the space allows a movement in the direction from the first end (3) of the yoke and the first magnet (7) to the second end (4) of the yoke and the second magnet (8) as indicated by the arrow. Preferably, the core element is only movable in the vertical direction, viz. a direction parallel to the magnetic axis of the two magnets. Mechanical measures may be taken to prevent the core element from moving in the horizontal direction, viz. perpendicular to the direction of the magnetic axis. Such measures may also be omitted. Due to the magnetic forces exerted on the core element by the permanent magnets, the reluctance transducer has the characteristics of a negative stiffness. A negative stiffness cancels or reduces the stiffness of a system in which it is placed by exerting an opposing force. When during use of the reluctance transducer the distance (13) between the core element (6) and the first end (3) of the yoke, and the distance (11) between the core element and the first magnet (7), increases than the distance between the core element and the second end (4) of the yoke and between the core element and the second magnet decreases.

The electrical winding (23) that is wound around a portion (19) of the soft ferromagnetic yoke can be used to induce a magnetic flux in the soft ferromagnetic yoke by applying a voltage across the winding to create an electrical current in the winding. This additional magnetic flux, viz. in addition to the flux of the two permanent magnets, causes an additional force on the core element (6). As a consequence the core element will move towards the first end (3) or the second end (4) of the yoke. This allows applying the reluctance transducer as an actuator. If the electrical winding is omitted than the reluctance transducer can be applied for stiffness compensation.

The reluctance transducer shown in FIG. 5 can also be applied as a sensor for measuring a displacement, a velocity, or an acceleration. A displacement of the core element will result in a voltage across the winding and an electrical current in the winding, depending on the displacement.

Figure 6:
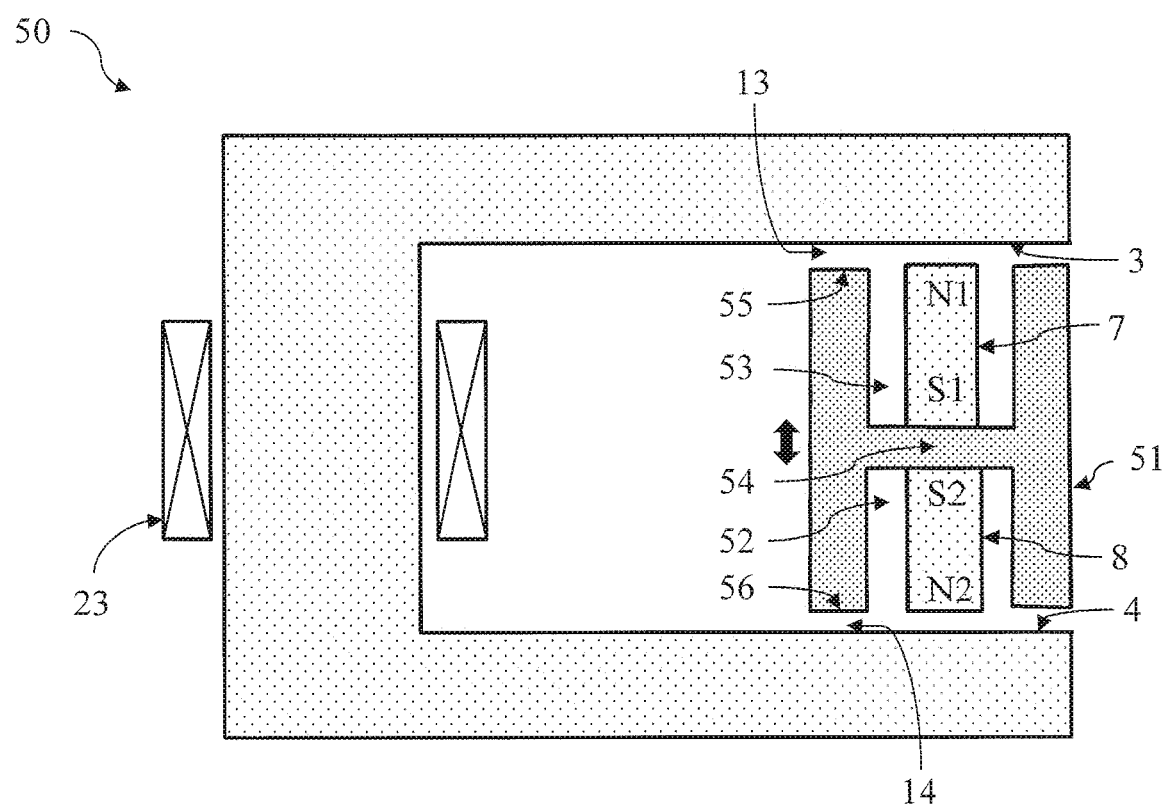
FIG. 6 shows an embodiment of the reluctance transducer in which the magnets are fixed to the core element.

In the embodiments of the reluctance transducer discussed so far the permanent magnets are mechanically coupled to each other via a portion of the soft ferromagnetic yoke. In the embodiment of the reluctance transducer (50) of which a cross-sectional view is shown in FIG. 6, the magnets are mechanically and magnetically coupled via a soft ferromagnetic portion (54) of the core element (51). An advantage of this embodiment of the reluctance transducer is that the point at which the magnetic force grips the core element does not change relative to the centre of gravity of the core element when the core element moves in lateral direction, viz. in a direction perpendicular to the direction from the first end (3) of the yoke to the second end (4) of the yoke. The core element is provided with two cavities for receiving the permanent magnets. One cavity (53) is arranged at the side of the element that is facing the first end (3) of the soft magnetic yoke and the other cavity (52) is arranged at the side facing the second end (4) of the yoke. Each of the cavities holds a permanent magnet that is fixed at one pole to the bottom of the cavity. The inner dimensions of the cavities in the lateral direction are larger than the width of the magnets to obtain a space between the magnets and the side walls of the cavities. More in particular, the space between the magnets and the side walls of the cavities is sufficient to force the magnetic flux of the first magnet (7) mainly via the first slot (13) and the magnetic flux of the second magnet (8) mainly via the second slot (14).

The two permanent magnets (7,8) are arranged relative to each other so that equivalent poles (S1,S2) that are mechanically and magnetically coupled by a soft ferromagnetic portion (54) of the core element, are facing each other and thus their magnetic orientation is opposite. The other two equivalent poles (N1,N2) are magnetically insulated from each other by the spaces (13,14) that allow the core element moving from the first end (3) of the yoke to the second end (4) of the yoke, and vice versa. Instead of being arranged in cavities, the magnets may for example also be arranged at the opposite surfaces of a flat core element. In FIG. 6 a electrical winding (23) for applying the reluctance transducer as a magnetic bearing, a sensor or as an actuator is shown, but such a winding can be omitted when the reluctance transducer is applied for stiffness compensation.

Figure 7:
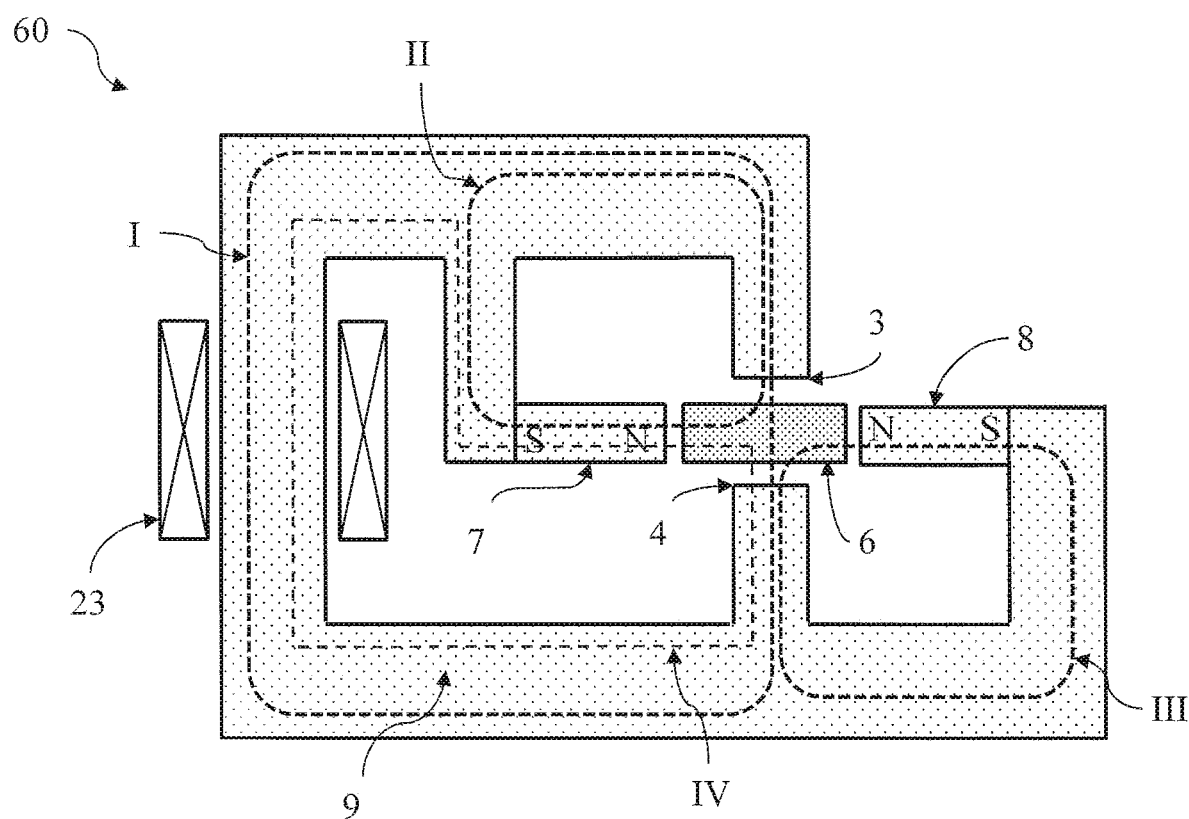
FIG. 7 shows an embodiment of the reluctance transducer in which the magnets are arranged perpendicular to the line between the two ends of the yoke.

The embodiment of the reluctance transducer (60) shown in FIG. 7 illustrates that the direction of the movement of the soft ferromagnetic core element need not to be the direction of the axis of the permanent magnets. Although there are many similarities between the embodiments shown in FIG. 3 and FIG. 7, there also differences that may be advantageous for specific applications. The soft ferromagnetic core element (6) is situated in the space that is defined by two ends (3,4) of the yoke and the magnets (7,8). The two magnets are arranged along a common line but the first magnet and the second magnet are magnetically oriented in opposite direction so that the equivalent poles, here the North poles, are facing each other. The magnetic axis of the magnets is directed perpendicular to the direction from the first end (3) of the yoke to the second end (4) of the yoke. The North poles of the magnets are magnetically insulated from each other by a space comprising the core element (6).

The other equivalent poles, here the South poles, are magnetically and mechanically coupled by a soft ferromagnetic portion (9) of the yoke. The static forces on the core element are such that they try to minimize the magnetic resistance of the magnetic circuit of which the core element is a part of. The electrical winding (23) can induce a magnetic flux as indicated by the circuit (I), the flux passing the core element in the direction from the first end (3) of the yoke to the second end (4) of the yoke, or vice versa. The second permanent magnet (8) is part of a magnetic circuit (III), whereas the first permanent magnet (7) is part of another the magnetic circuit (II). The first and second magnet are also part of a magnetic circuit comprising a part of the portion (9) of the yoke that couples the South poles of the two magnets. Only the magnetic circuit (IV) comprising the first magnet is indicated in FIG. 7.

The core element can be moved from the first end (3) to the second end (4) of the yoke and visa versa by a magnetic flux (III) that is induced by the winding (23). In stead of applying this reluctance transducer as an actuator, it can also be applied as a sensor by measuring the current in the winding or the voltage across the winding. As in other embodiments of the reluctance transducer, the winding can be omitted for stiffness correction.

The above-described reluctance transducer can be used in a wide variety of applications, including magnetically driven actuators, magnetic sensors sensing mechanical displacements, magnetic bearings, and compensation structures for reducing a positive stiffness or increasing a negative stiffness of a structure.

Another embodiment of the reluctance transducer is discussed with reference to FIG. 8. As the embodiment shown in FIG. 3, the yoke of the embodiment (70) of the reluctance transducer shown in FIG. 8 comprises three separate soft ferromagnetic portions. The first portion has a form that has some similarities with the yoke shown in FIG. 7 and has a shape that can be described as a horseshoe of which the end parts are split in two branches. The end (3,4) of one of the two branches is facing the core element (6), whereas at the other branch a magnet is arranged. An electrical winding (23) is wound around a part of this first portion if the transducer is applied as a magnetic bearing, as a sensor, or as an actuator. The winding can be omitted when the transducer is applied as negative stiffness for stiffness compensation. The first magnet (7) and the second magnet (8) are arranged such that the two permanent magnets are in parallel but in opposite direction, viz. they have an opposite magnetic orientation relative to each other. The direction of the magnetic axis of the two magnets is mainly in parallel with the direction of movement of the core element as indicated by the arrow in FIG. 8. The ends of the two branches (71,73) facing the core element are each facing an opposite side of the core element.

A second soft ferromagnetic portion (71) of the yoke is mechanically coupled to the first portion by the first permanent magnet (7). A third soft ferromagnetic portion (8) of the yoke is mechanically coupled to the first portion by the second permanent magnet (8). The second and third portion of the yoke have a U-shape and are arranged such that the end (74) of the second portion is facing one side of the core element, whereas the end (75) of the third portion is facing the other side of the core element. The portions of the yoke are arranged such that the ends (3,4,74,75) leave a space for the movable core element. The end of the branch (71) that is mechanically coupled to the first magnet (7) and the second end (4) of the yoke are facing the same side of the core element. The other side of the core element is facing the end of the of the branch (73) that is mechanically coupled to the second magnet (8) and the first end (3) of the yoke.

Figure 8:
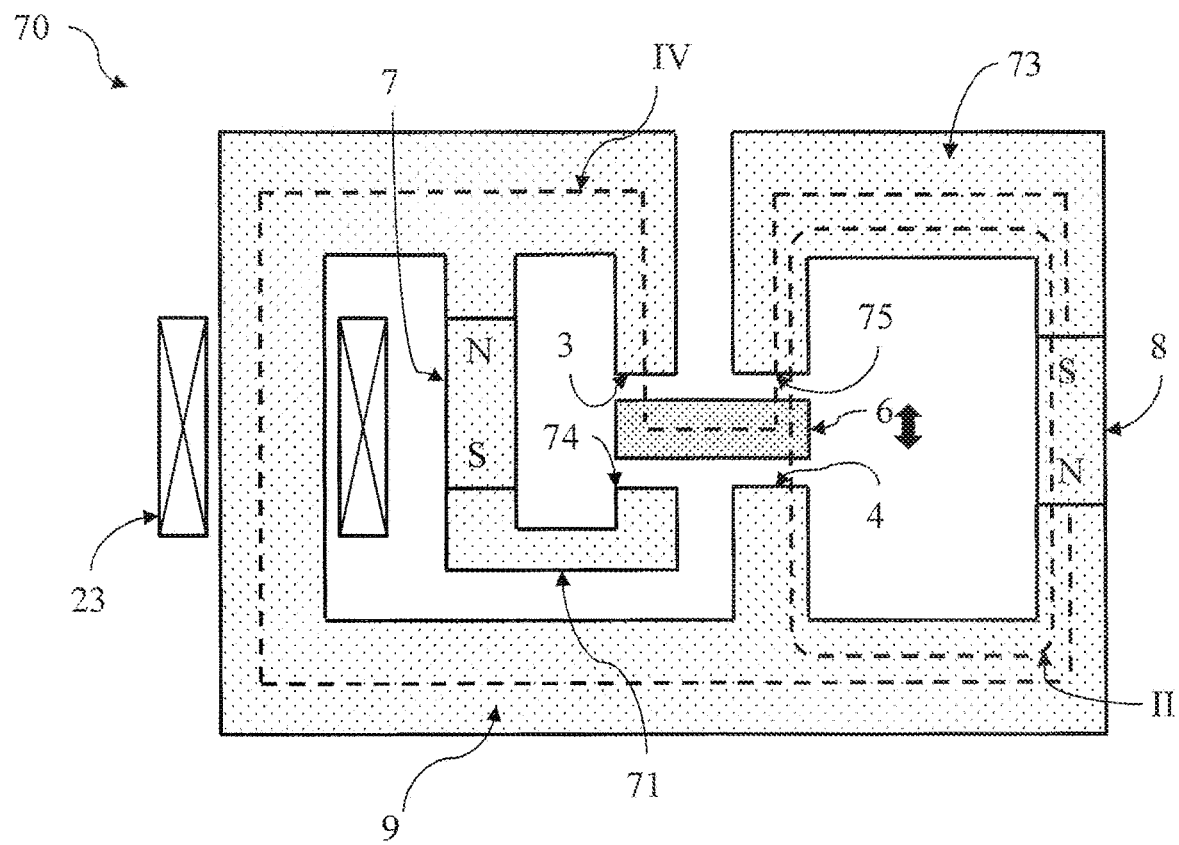
FIG. 8 shows an embodiment of the reluctance transduces in which the magnets are arranged within the yoke, parallel to the line between the two ends of the yoke.

Magnetic circuits similar to those of the reluctance transducer shown in FIG. 8 can be realised by arranging the three portions of the yoke and the magnets in a different way. Without being exhaustive, some of such alternatives are mentioned here. The first magnet (7) and the second yoke portion (71) may change place such that the magnet is facing the core element with its South pole (and changing the shape of the second portion accordingly). The second magnet (8) may be placed at the position of the upper part of third portion, with its South pole directed to the left. Of course the shape of the third portion and the first portion have to be adapted such that space for the core element remains the same.

Preferably, the magnets of the embodiment of the reluctance transducer shown in the FIGS. 2,3,5, and 6 are arranged such that the magnetic axes of both magnets are on the same line. However, the axes of the magnets may also be shifted relative to each other. This means that, for example, the first magnet (7) in the afore mentioned figures may be arranged more to the left.

In all the embodiments discussed above, the orientation of the magnets may be reversed, so the North poles may be changed into South poles and vice versa provided that both magnets (7,8) are reversed simultaneously.

Figure 9:
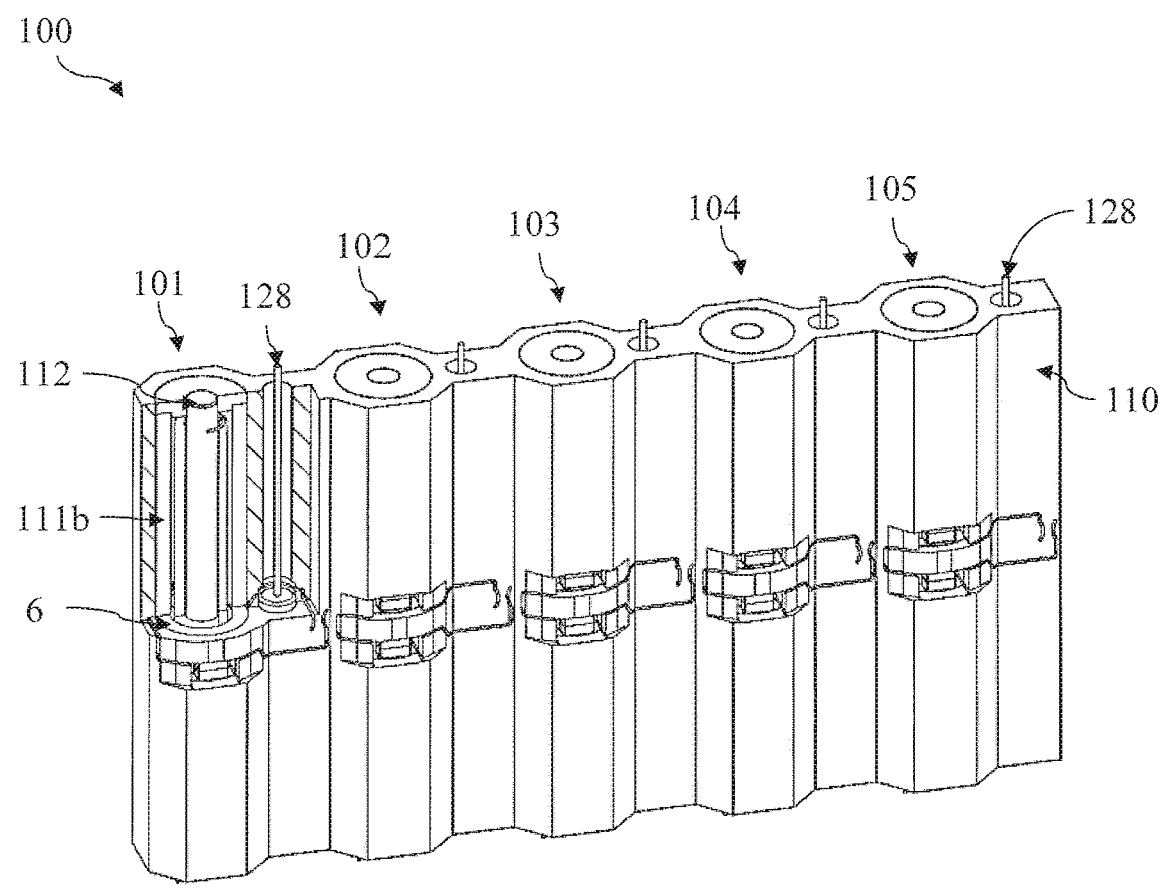
FIG. 9 shows a schematic perspective view of an actuator structure.

FIG. 9 shows a schematic perspective view of an actuator structure (100) comprising a frame (110) supporting an array of individual actuators (101-105) that are based on the basic reluctance transducer principle explained referring to the embodiment shown in FIG. 5. Preferably, the frame (110) is composed of material with a low relative magnetic permeability, viz. a non-magnetic material. As an example, the frame (110) is manufactured from aluminum. The array of actuators (101-105) is arranged as a straight row. However, the array of actuators can also extend in two dimensions, forming a two-dimensional grid of actuators, e.g. for controlling the position and/or orientation of mirror elements in an adaptive mirror. Further, the actuators may have different length and/or may be arranged at different levels in the direction of the third dimension, for example for optimal actuation of mirror elements. One of the actuators (101) is shown in partially cross-sectional view in FIG. 9 and will be further discussed with reference to FIG. 10.

Figure 10:
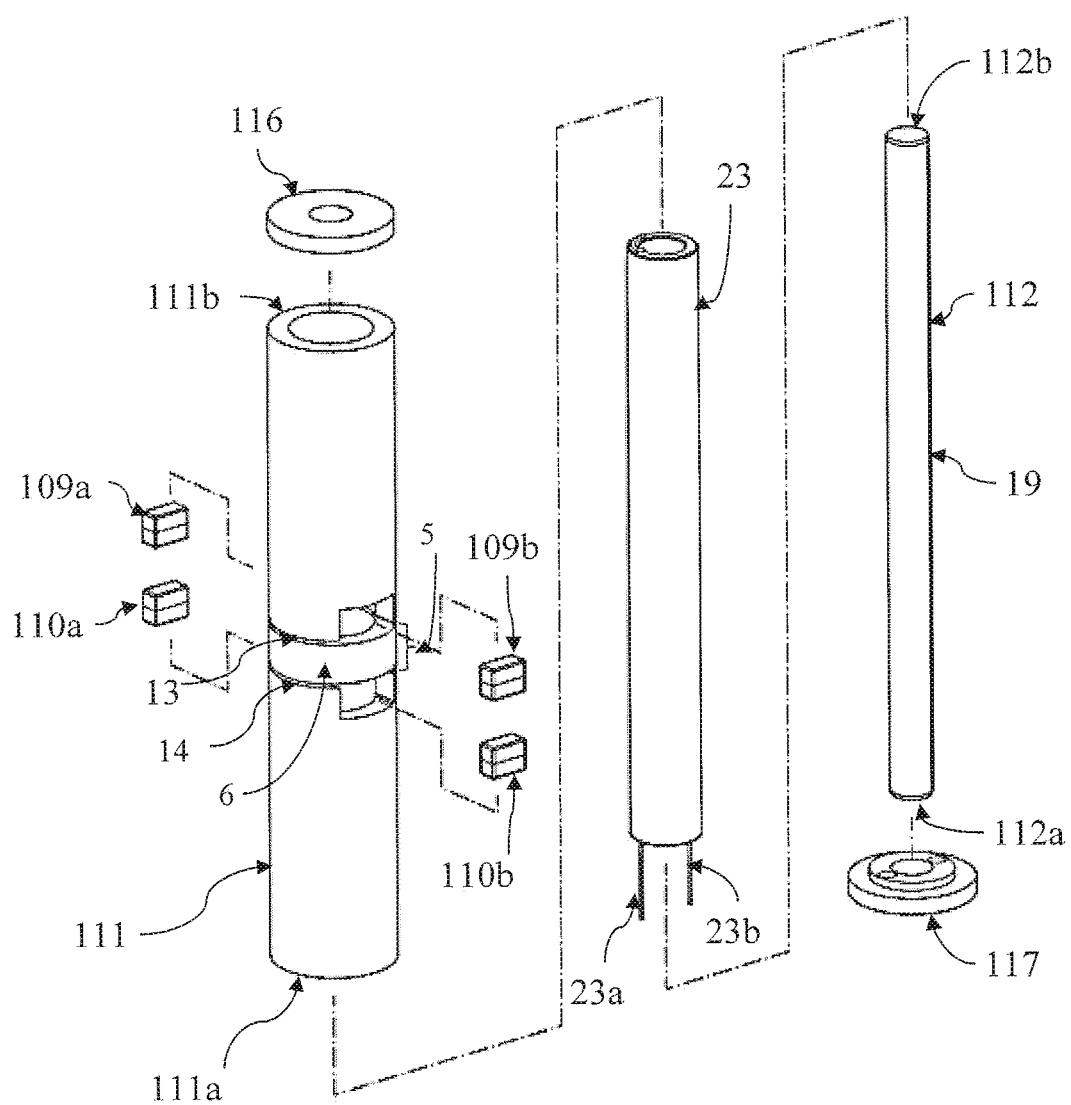
FIG. 10 shows a schematic exploded view of an actuator from the actuator structure shown in FIG. 9.

FIG. 10 shows a schematic exploded view of an actuator (101) from the actuator structure (100) shown in FIG. 9. The soft ferromagnetic yoke has a first portion (111) including the first end (3) and the second end (4), respectively. Further, the soft ferromagnetic yoke has a second portion (112) including the section that is surrounded by the electrical windings (23), the first and the second portion (111, 112), the upper and lower lid (116,117) forming a magnetically closed loop bridging the intermediate space (5).

The first portion (111) is implemented as a cylinder shell. Further, the second portion (112) includes a cylinder kernel, concentrically arranged with respect to the cylinder shell (111). The second portion also includes intermediate sections magnetically connecting axial ends (112*a*,*b*, 111*a*,*b*) of the cylinder kernel (112) and the cylinder shell (111), respectively. The intermediate sections are implemented as an upper lid (116) and a lower lid (117). Thus, the cylinder shell (111) bridging the intermediate space (5), the upper lid (116), the cylinder kernel (112) and the lower lid (117) constitute a circuit for conducting a magnetic flux. The cylinder kernel (112) may protrude from the upper lid (116) and/or the lower lid (117). Electrical windings (23) are located between the cylinder kernel (112) and the cylinder shell (111). The electrical windings (23) are provided with electrical terminals (23*a*,*b*) to feed the windings (23).

The construction shown in FIG. 10 thus includes a cylinder kernel (112), electrical windings (23) and a cylinder shell (111) arranged concentrically with respect to each other. The actuator (101) also includes permanent magnetic elements (109*a*,*b*, 110*a*,*b*) as explained in more detail referring to FIG. 10.

Figure 11:
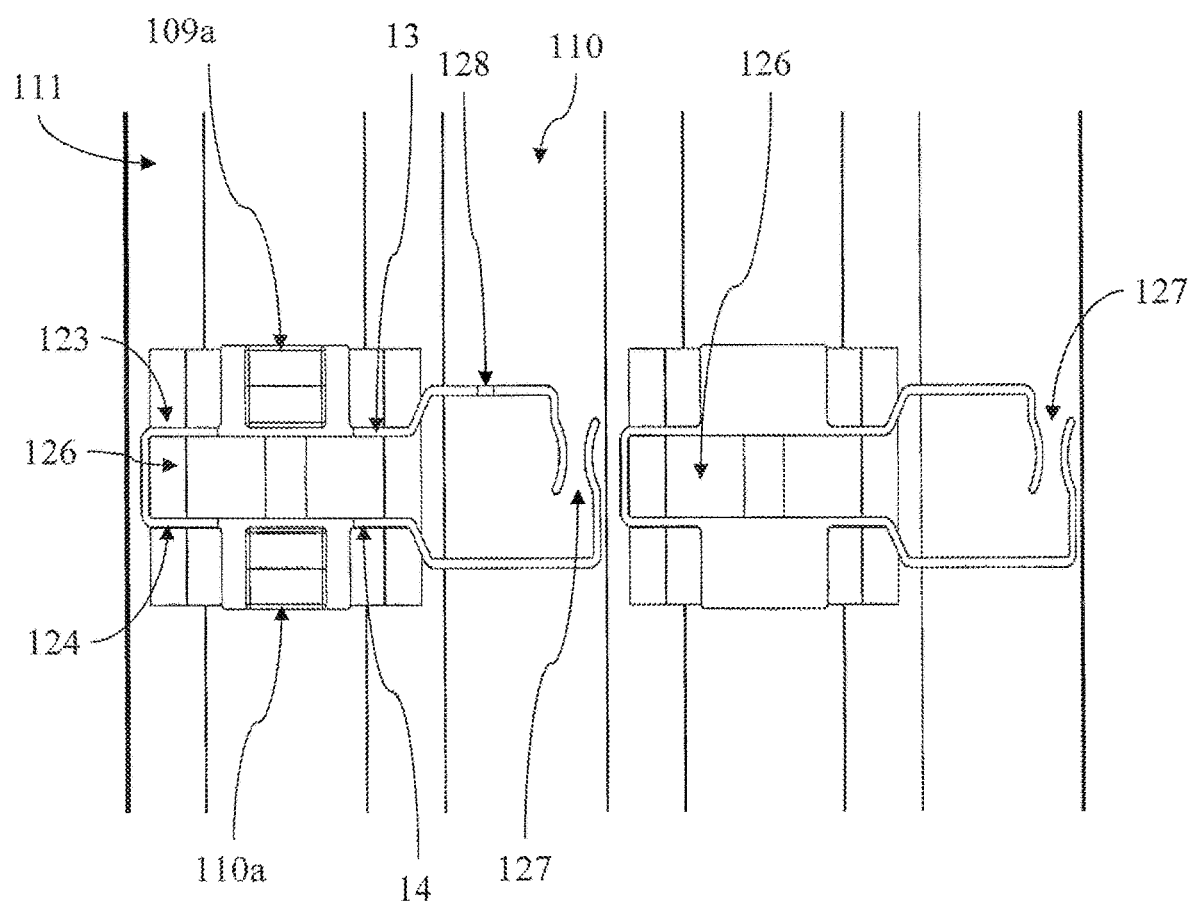
FIG. 11 shows a schematic side view of a details of the actuator shown in FIG. 10.

FIG. 11 shows a schematic side view of a detail of the actuator (101) shown in FIG. 10. A first end (123) of the first portion (111) of the soft ferromagnetic yoke includes a cavity wherein a first permanent magnet (109*a*) is received. Similarly, a second end (124) of the first portion (111) of the soft ferromagnetic yoke includes a cavity wherein a second permanent magnet (110*a*) is received. The first and second permanent magnets (109*a*, 110*a*) face each other and are oriented magnetically in opposite order, i.e. with the North pole facing each other, or with the South pole facing each other.

A core (126) is integrally manufactured with the frame (110), and is formed as a lever pivoting with respect to an elastic hinge (127). Further, the actuator (101) includes a separate actuator element (128) extending axially with respect to the cylinder shell (111) and cylinder kernel (112), through the frame (110) and protruding from a top section of the frame, see also FIG. 9. The core partially occupies the intermediate space (5) between the ends (123, 124) of the soft ferromagnetic yoke. Between the core (126) and the ends (123, 124) of the soft ferromagnetic yoke, a first and second slot (13,14), respectively, is defined allowing the core to move upwardly and downwardly to drive the separate actuator element (128).

By flowing an electrical current through the electrical windings (23), the core (126) moves upwardly or downwardly, depending on the flowing direction in the electrical windings. In principle, the configuration can also be used for sensing a mechanical displacement. When the core (126) moves, an electrical current is forced to flow through the electrical windings (23). The amount of electric current is a measure for the displacement of the core (126).

The left-hand part of FIG. 11 shows an actuator (101) wherein the permanent magnets (109, 110) are present. The right-hand part of FIG. 11 shows an actuator (102) wherein the magnets are not yet installed, prior to a final manufacturing stage. The integrally formed core (126) can be realized by a wire cut electrical discharge machining process. An advantage of using such a machining process is that the space may be made with tolerances that are smaller than the tolerances obtainable by an assembling process. However, also other manufacturing processes are applicable.

As shown in FIG. 10, two pairs of permanent magnet pairs are provided, the permanent magnets (109*a*, 110*a*; 109*b*, 110*b*) of each individual pair being arranged opposite to each other near the first and second slot (13,14), respectively, and magnetically oriented opposite to each other, thereby enhancing the power of the actuator. Generally, even more than two pairs of permanent magnets can be implemented. In the shown embodiment, the magnetic elements (109, 110) are located at the same position relative to the hinge (127) so that the magnetic forces add constructively. In principle, other locations can be selected, thereby enabling movements of the core in mutually different directions.

Figure 12:
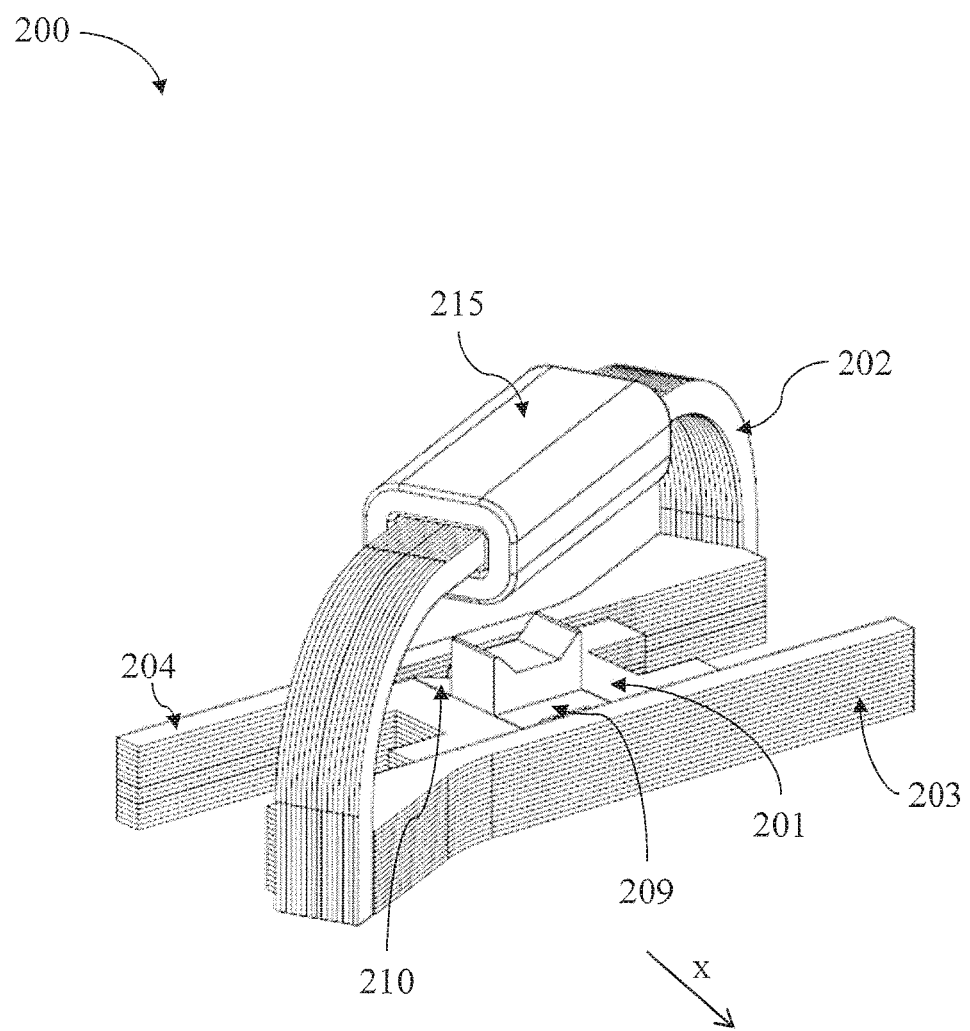
FIG. 12 shows a schematic perspective view of a first embodiment of a magnetic bearing.

FIG. 12 shows a schematic perspective view of an embodiment of a magnetic bearing (200) including a reluctance transducer. The magnetic bearing (200) essentially blocks movement of a core (201), also called rotor, in a specific direction, here the x-direction. The bearing (200) includes a soft ferromagnetic yoke (202) and electric windings (215), also called a coil, for generating a magnetic flux in the soft ferromagnetic yoke (202). According to an aspect of the current invention, the soft ferromagnetic yoke (202) includes first and second ends (203, 204) that are formed as mutually aligned bars. In the shown embodiment, the rotor (201) is provided with a pair of magnetic elements (209, 210), located and oriented opposite to each other.

Figure 13:
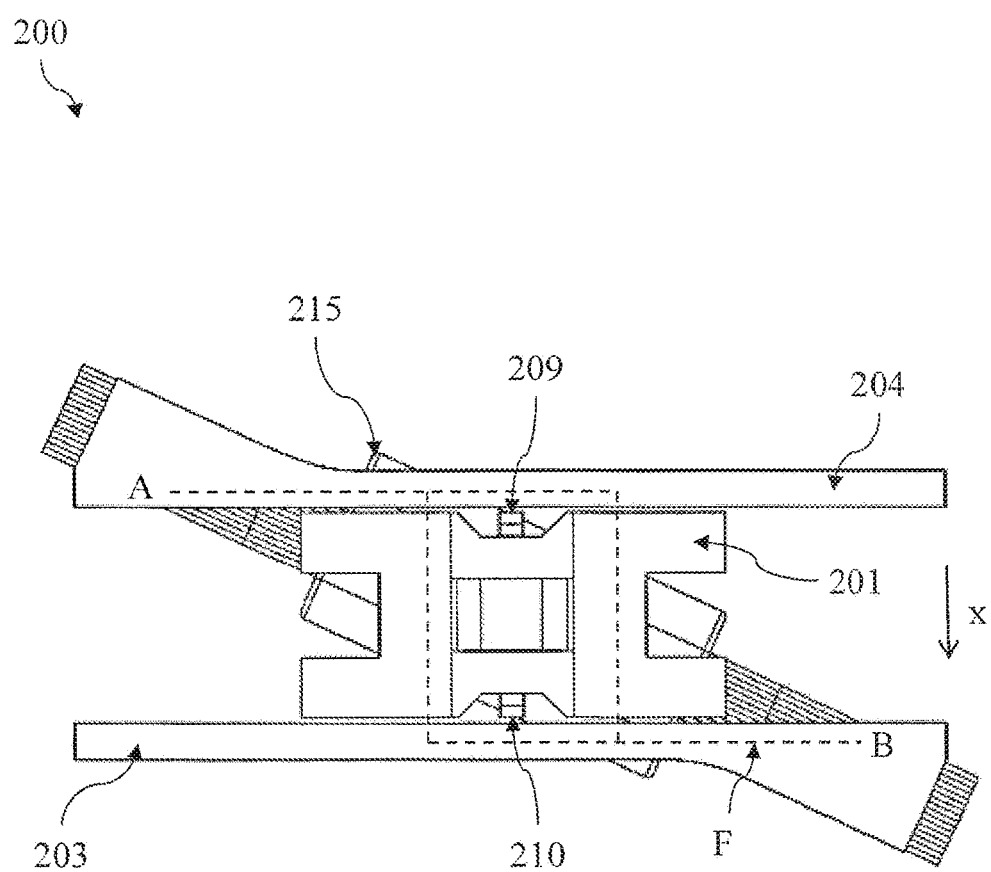
FIG. 13 shows a schematic cross-sectional view of the magnetic bearing shown in FIG. 12.

FIG. 13 shows a schematic cross-sectional view of the magnetic bearing (200) shown in FIG. 12. By locating the magnetic elements (209, 210) on the rotor (201), the points of application of the magnetic force remain invariant. Therefore, a movement of the rotor (201) in a direction transverse to the x-direction does not influence the magnetic performance of the bearing (200). The effective flux path (F) is not changed during a movement of the rotor.

Figure 14:
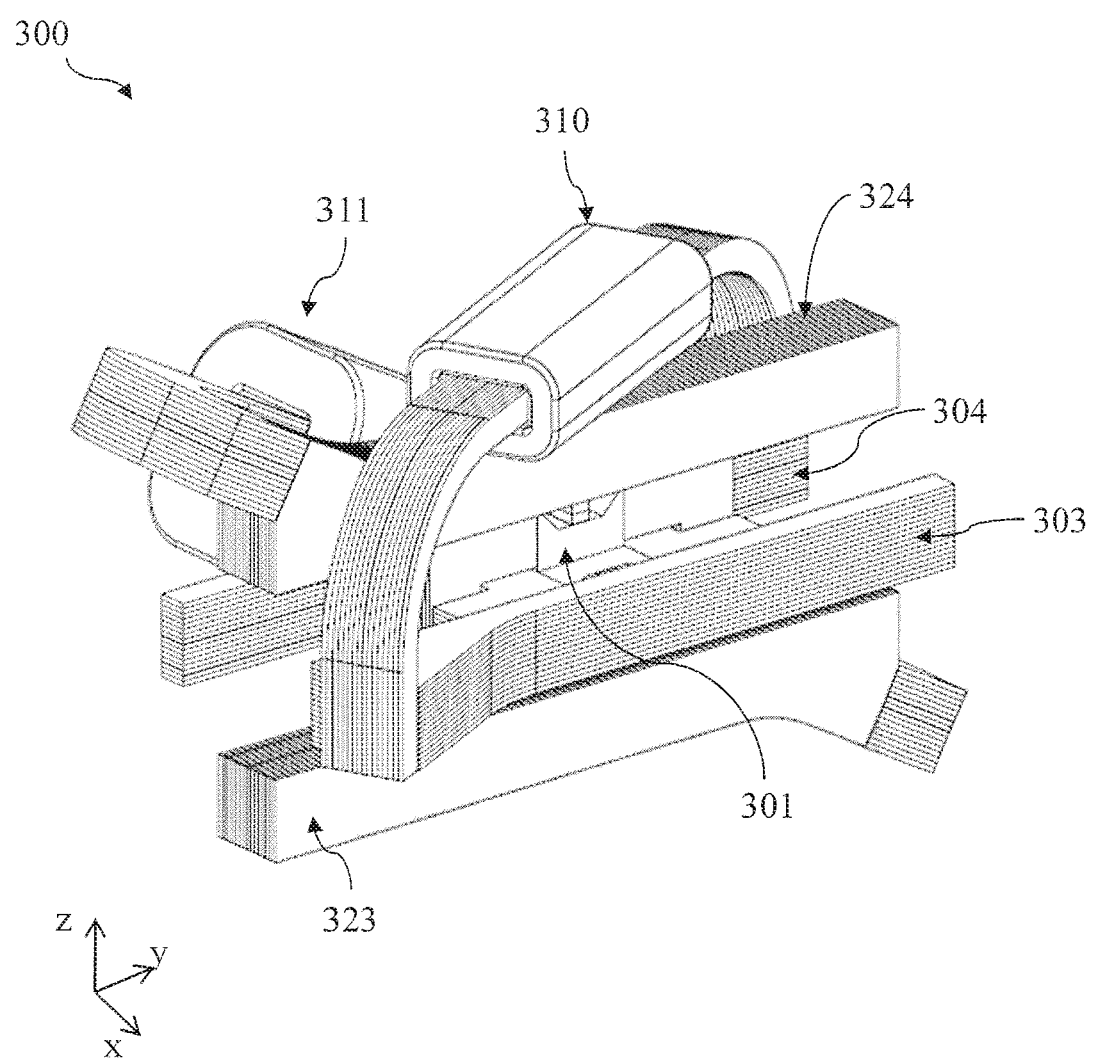
FIG. 14 shows a schematic perspective view of another embodiment of a magnetic bearing.

FIG. 14 shows a schematic perspective view of another embodiment of a magnetic bearing (300). Here, an additional reluctance transducer is provided blocking the rotor (301) in a further direction, the z-direction. The magnetic bearing (300) includes two coils (310, 311) wherein the ends (303, 304) of the first coil (310) face to a direction, the x-direction, that is different from the direction, i.e. the z-direction, to which the ends (323, 324) of the second coil (311) face. In the shown embodiment, the facing directions are transverse with respect to each other. However, in principle, also other directions are possible, e.g. a tilted direction. Further, the transducer (300) comprises two pairs of permanent magnetic elements (340*a*, 340*b*; 341*a*, 341*b*), see FIG. 15, the permanent magnets of each individual pair being arranged opposite to each other near the first and second slot, respectively, of corresponding coil ends and magnetically oriented opposite to each other, in conformity with the above-described principle.

Figure 15:
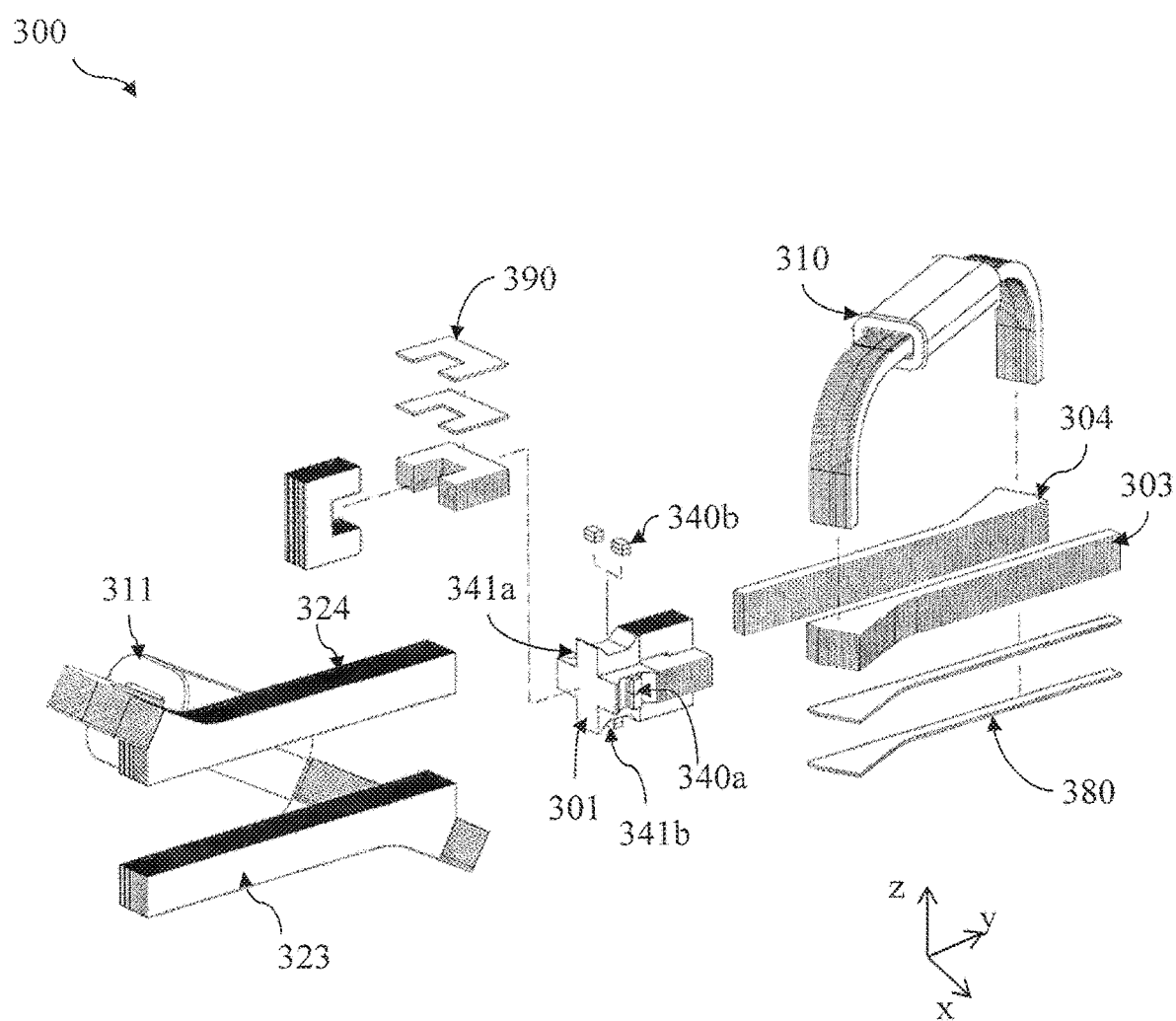
FIG. 15 shows a schematic exploded view of the magnetic bearing shown in FIG. 14.

The magnetic bearing (300) shown in FIG. 15 has a dual character blocking movement of the rotor (301) in two directions, i.e. in the x-direction and in the z-direction. In principle, a further dual magnetic bearing can be applied to the rotor (301) blocking two further degrees of freedom, in terms of location and/or orientation. In addition, a further single magnetic bearing can be added to the structure, e.g. a magnetic bearing as shown in FIG. 12. Then, only a single degree of freedom is left to the rotor (301), e.g. a degree of freedom in shifting in a particular direction.

FIG. 15 shows a schematic exploded view of the magnetic bearing (300) shown in FIG. 14. As shown, the soft magnetic elements can be manufactured from distinct ferromagnetic material layers (380) to counteract eddy current effects. This also applies to the soft magnetic material on the core (301).

It is noted that, generally, the core includes soft magnetic elements for magnetically conducting the flux bridging between the ends of the soft magnetic elements. It is further noted that a multiple number of electrical windings can be applied to a soft magnetic element. Also, resistive elements can be added in the electrical windings.

The invention is not restricted to the embodiments described herein. It will be understood that many variants are possible. Other such variants will be apparent for the person skilled in the art and are considered to fall within the scope of the invention as defined in the following claims.

What is claimed is:

1. A reluctance transducer comprising:
a soft ferromagnetic yoke having a first end and a second end, the first end and the second end defining an intermediate space,
a soft ferromagnetic core element partly filling the intermediate space, the soft ferromagnetic core element and the yoke being movable relative to each other in a direction between the first end of the yoke and the second end of the yoke, and
a first permanent magnet and a second permanent magnet arranged relative to each other such that the first permanent magnet and the second permanent magnet exert opposite forces on the soft ferromagnetic core element;
wherein a first pole of the first permanent magnet is mechanically and magnetically coupled by an intermediate soft ferromagnetic element to an equivalent first pole of the second permanent magnet,
wherein a second pole of the first permanent magnet is magnetically insulated from an equivalent second pole of the second permanent magnet, and
wherein the soft ferromagnetic core element is formed as a lever pivoting with respect to an elastic hinge and moving an actuator element or a sensor element.

2. The reluctance transducer according to claim 1, wherein the first permanent magnet and the second permanent magnet are arranged such that the direction of a magnetic flux of the first permanent magnet at the first end of the yoke is opposite to the direction of a magnetic flux of the second permanent magnet at the second end of the yoke.

3. The reluctance transducer according to claim 2, wherein the yoke comprises a first portion fixed to the first pole of the first permanent magnet and a second portion fixed to the second pole of the first permanent magnet.

4. The reluctance transducer according to claim 3, comprising a third portion of the yoke and wherein the first pole of the second permanent magnet is fixed to the third portion of the yoke and the second portion is fixed to the second pole of the second permanent magnet.

5. The reluctance transducer according to claim 2, wherein the soft ferromagnetic element mechanically coupling the two permanent magnets is a portion of the soft ferromagnetic core element.

6. The reluctance transducer according to claim 5, wherein a first surface of the soft ferromagnetic core element is facing the first end of the yoke and a second surface of the soft ferromagnetic core element is facing the second end of the yoke and wherein the first surface is provided with a cavity receiving the first permanent magnet and the second surface is provided with a cavity receiving the second permanent magnet.

7. The reluctance transducer according to claim 1, wherein the intermediate soft ferromagnetic element is a portion of the yoke.

8. The reluctance transducer according to claim 7, wherein the first end of the soft ferromagnetic yoke is provided with a first cavity receiving the first permanent magnet and the second end of the soft ferromagnetic yoke is provided with a second cavity receiving the second permanent magnet.

9. The reluctance transducer according to claim 8, wherein the soft ferromagnetic yoke has a first portion implemented as a cylinder shell comprising the first end and the second end, and a second portion that is surrounded by an electrical winding, and wherein the second portion includes a cylinder kernel, concentrically arranged with respect to the cylinder shell, the second portion further including intermediate sections magnetically connecting axial ends of the cylinder kernel and cylinder shell, respectively.

10. The reluctance transducer according to claim 8, comprising a multiple number of permanent magnetic pairs, the permanent magnetic elements of each individual pair being arranged opposite to each other near first and second slots, respectively, and magnetically oriented opposite to each other.

11. The reluctance transducer according to claim 8, wherein first and second end portions of the soft magnetic yoke are formed as mutually aligned bars.

12. The reluctance transducer according to claim 7, wherein the direction from the first end of the yoke to the second end of the yoke is perpendicular to the direction from the first permanent magnet to the second permanent magnet.

13. The reluctance transducer according claim 1, wherein the soft ferromagnetic yoke has a first portion comprising the first end and the second end, and a second portion that is surrounded by an electrical winding.

* * * * *